United States Patent [19]
Ottesen et al.

[11] Patent Number: 5,267,110
[45] Date of Patent: Nov. 30, 1993

[54] ROTARY ACTUATOR FOR A DIRECT ACCESS STORAGE DEVICE

[75] Inventors: Hal H. Ottesen, Rochester, Minn.; Muthuthamby Sri-Jayantha, Ossining, N.Y.

[73] Assignee: International Business Machines Corporation, Armonk, N.Y.

[21] Appl. No.: 672,161

[22] Filed: Mar. 19, 1991

[51] Int. Cl.$^5$ .......................... G11B 5/55; G11B 5/596
[52] U.S. Cl. .................. 360/106; 360/77.02; 360/78.04; 360/78.12; 360/105
[58] Field of Search ............... 360/77.03, 77.05, 77.02, 360/78.01–78.14, 105–107

[56] References Cited

U.S. PATENT DOCUMENTS

| | | | |
|---|---|---|---|
| 4,707,754 | 11/1987 | Patel et al. | 360/106 |
| 4,812,935 | 3/1989 | Sleger | 360/106 |
| 4,994,931 | 2/1991 | Foote | 360/106 |
| 5,016,131 | 5/1991 | Riggle et al. | 360/106 |
| 5,018,035 | 5/1991 | Johnson | 360/106 |
| 5,023,733 | 6/1991 | Koga et al. | 360/77.04 |
| 5,023,736 | 6/1991 | Kelsic et al. | 360/105 |

Primary Examiner—William L. Sikes
Assistant Examiner—Terry D. Cunningham
Attorney, Agent, or Firm—Joan Pennington; Richard E. Billion; Bradley A. Forrest

[57] ABSTRACT

A rotary actuator head driver for a direct access storage device includes a transducer head moving in a radial direction across a disk surface for reading and/or writing data on a plurality of tracks for storing data. A support arm supports the transducer head relative to the disk surface. The support arm is connected to a pivot defining an axis of rotation spaced from the transducer head. A head driver positions the transducer head over one track in a track following mode or moves the transducer head from one track to another track in a seek mode. The head driver generates oppositely directed forces to produce a net torque applied to the support arm through the pivot. The oppositely directed forces have a line of action orthogonal a dominant motion of the transducer head. As a result, any parasitic force is orthogonal to the dominant motion and does not contribute to track misregistration errors. When the oppositely directed forces have an equal magnitude for force cancellation, the effect parasitic forces are eliminated. The head driver includes a pair of miniature voice coil motors or an in-the-hub motor.

18 Claims, 3 Drawing Sheets

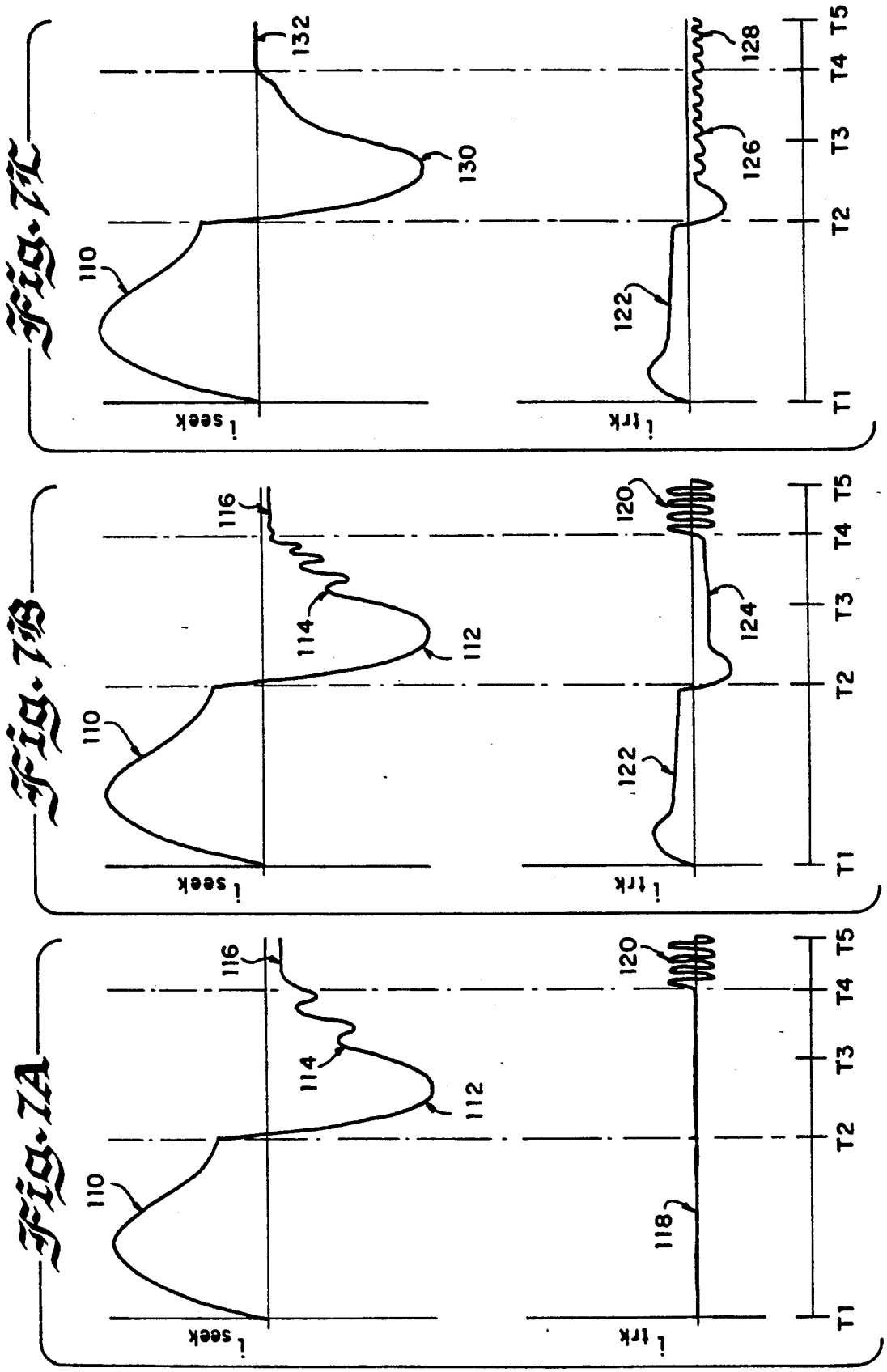

ROTARY ACTUATOR FOR A DIRECT ACCESS STORAGE DEVICE

BACKGROUND OF THE INVENTION

1. Field of the Invention

The present invention relates to rotary actuators for a direct access storage device (DASD), and more particularly to improved driving methods and rotary actuators for a high track density storage device.

2. Description of the Prior Art

Disk drive units incorporating stacked, commonly rotated rigid magnetic disks are used for storage of data in magnetic form on the disk surfaces. Transducer heads driven in a path toward and away from the drive axis write data to the disks and read data from the disks. Data is recorded in concentric data information tracks arrayed on the surfaces of the disks.

Known rotary actuators for positioning the transducer heads relative to the disk surfaces typically include a pivotable support member and a comb assembly including several closely spaced rigid arms. Attached to each rigid arm is at least one transducer head. Typically one of the rigid arms includes an extension driven in a pivotal motion by a voice coil motor. A voice coil cooperating with permanent magnets and core assembly is operatively controlled for moving the transducer heads in synchronism in a radial direction in order to position the heads in registration with the tracks to be followed.

For example, U.S. Pat. No. 4,697,127 discloses a voice coil motor driven disk file actuator. The disclosed actuator uses a single voice coil motor (VCM) and an adaptive controller system for controlling the coil current applied to the actuator VCM to control the position of the transducer head of the file. The basic modes of operation are track following and seek. Track following holds the transducer head over a desired track and seek moves the head to a desired track. A settle mode exists during the transition from the seek to the track following mode. Position and coil current measurements are used to generate a position error signal. The position error and an estimated velocity signal are used to generate the magnitude of the coil current during seek operations. In the track following mode, an integrated position signal, position and estimated velocity signals are combined to produce a composite signal corresponding to the current magnitude to be applied to the actuator VCM.

While known rotary actuators are adequate for present track density requirements, higher track densities or tracks per inch (TPI) for writing data on the disk surfaces require more precise movement. Parasitic and nonlinear movements resulting from non-ideal pivot design limit seek and track following performance of known rotary actuators. An ideal pivot has zero-stiffness and zero bias in the desired plane of motion and infinite stiffness in all other coordinate planes. Zero clearance between a sliding metal-to-metal interface required for an ideal pivot is impossible because a thin viscous lubricant film is necessary for proper lubrication. In rotary actuators incorporating a non-ideal pivot design based upon preloaded ball bearings or flexure springs, parasitic motion is generated in the opposite direction of the desired motion as a result of finite stiffness or fluid film gap.

SUMMARY OF THE INVENTION

It is an object of the present invention to provide a rotary actuator overcoming many of the disadvantages associated with rotary actuators used in the past. Other objects are to provide an improved rotary actuator for moving the transducer heads in a dominant motion without exciting parasitic countermotions; to provide a rotary actuator for minimizing effects of bias forces and track misregistration errors; to provide a rotary actuator having better resonance frequency characteristics; to provide a rotary actuator for independently optimizing the seek and track following modes; to provide a rotary actuator having a center of torque aligned with both the center of mass and rotation; and to provide a rotary actuator having redundancy against one coil failure. An object of an additional feature of the invention is to provide a rotary actuator with a velocity tachometer for measuring an actual velocity of the transducer head. A further object of the present invention is to provide a low cost method of measuring velocity of the transducer head.

In brief, the objects and advantages of the present invention are achieved by a rotary actuator for a direct access storage device including a disk surface having a plurality of tracks for storing data. A transducer head reads and/or writes data on the tracks and is supported by a support arm relative to the disk surface. The support arm is connected to a pivot defining an axis of rotation at a location spaced from the transducer head. A head driver positions the transducer head over one track in a track following mode and moves the transducer head from one track to another track in the seek mode. In accordance with the invention, the head driver generates oppositely directed forces to produce a net torque applied to the support arm through the pivot. The oppositely directed forces have a line of action orthogonal to a dominant motion of the transducer head. As a result, any parasitic force is orthogonal to the dominant motion and does not contribute to track misregistration errors. When the oppositely directed forces have an equal magnitude for force cancellation, the parasitic mode is eliminated.

BRIEF DESCRIPTION OF THE DRAWINGS

The present invention together with the above and other objects and advantages can best be understood from the following detailed description of the embodiment of the invention illustrated in the drawings, wherein:

FIGS. 7A, 7B and 7C are graphs illustrating alternative operational control methods for the actuators of FIGS. 5 and 6.

DETAILED DESCRIPTION OF THE PREFERRED EMBODIMENTS

Figure 1:
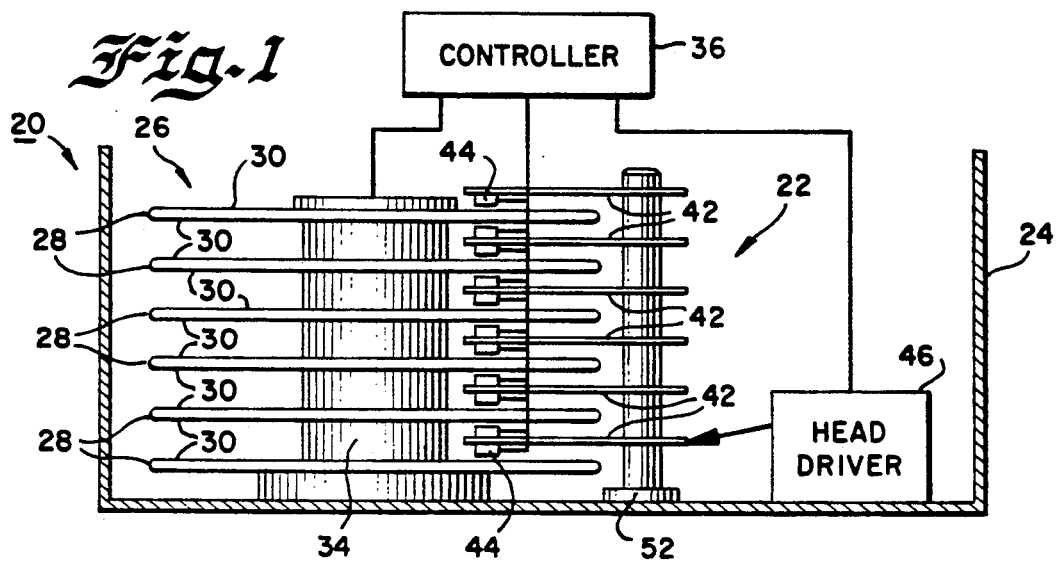
FIG. 1 is a schematic and simplified vertical sectional view of a magnetic disk drive unit embodying the present invention.
Figure 2:
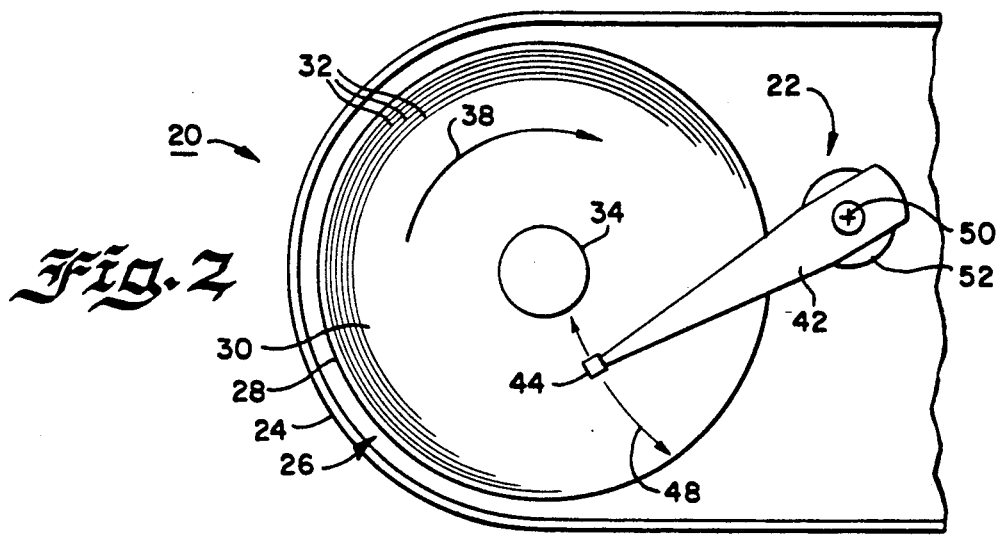
FIG. 2 is a fragmentary top plan view of the structure shown in FIG. 1.

In FIGS. 1 and 2, there is shown a magnetic disk drive unit designated generally as 20 including a rotary actuator assembly generally designated as 22 embodying the principles of the present invention. Disk drive unit 20 and the rotary actuator assembly 22 are illustrated in greatly simplified form sufficient for an understanding of the present invention because the utility of the present invention is not limited to the details of a particular drive unit construction. It should be understood that the rotary actuator assembly 22 of the invention can be adapted for use in other systems than magnetic disk drives, for example, such as optical memory systems.

Disk drive unit 20 includes a housing 24 enclosing a stack 26 of disks 28 having opposed magnetic surfaces 30. Disks 28 have numerous information tracks 32 arrayed in a concentric pattern on the magnetic surfaces 30. The disks 28 are mounted in parallel for simultaneous rotation on and by an integral spindle and motor assembly 34. A disk controller 36 operatively controls the integrated spindle and motor assembly 34 for rotating the disks 28, for example, at a substantially constant velocity in a clockwise (CW) direction, as indicated by an arrow 38 in FIG. 2.

Rotary actuator assembly 22 includes a plurality of arms 42, each supporting at least one transducer head 44 relative to a corresponding disk surface 30. Support arms 42 are driven rotatably and bidirectionally by a head driver 46 for moving the transducer heads 44 in a limited arc from one track 32 to another track as indicated by an arrow 48. Arms 42 are mounted on a pivot 50 defining an axis of rotation for transducer heads 44. Pivot 50 can include a bearing cartridge 52 interconnecting arms 42 for simultaneous positioning of the transducer heads 44 adjacent the disk surfaces 30.

When a call for disk access is received in conventional manner by the disk controller 36, motor 34 is operated if not already operating to rotate the disk stack 26 and the head driver 46 is energized to rotate arms 42 positioning the transducer heads 44 over a particular track 32 on the magnetic surfaces 30 of the disks 28. The transducer heads 44 are moved in the radial direction 48 across the disk 28 toward and away from the integral spindle and motor assembly 34.

Figure 3:
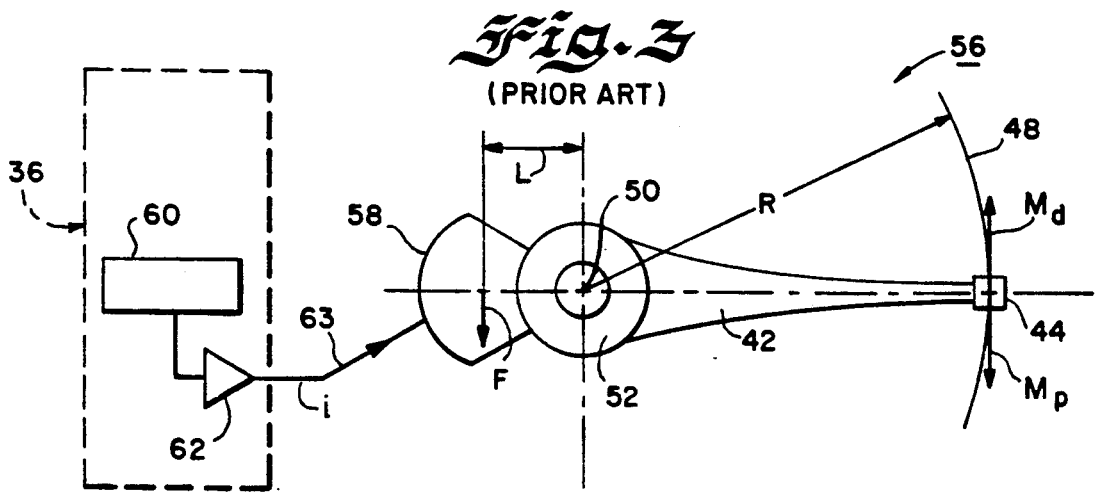
FIG. 3 is a schematic and simplified top view of a known rotary actuator including a single voice coil motor.

In FIG. 3, there is shown a known rotary actuator 56 including a single voice coil motor (VCM) 58 as the head driver. Disk controller 36 typically includes a microprocessor 60 and a current driver circuit 62 for generating a coil current i applied via a line 63 to the single VCM 58 to control the position of transducer heads 44. The single VCM 58 produces a torque T by a direct force F acting at distance L from the pivot axis 50, as shown by arrows labelled F and L. The equation for generated torque T is $$T = K_f i L$$

where $K_f$ equals the mechanical force constant. A dominant angular motion $M_d$ in the desired direction of movement of the transducer heads 44 resulting from the generated torque T is indicated by an arrow labelled $M_d$ or radius R times angle $\Theta$. With the single VCM 58, a parasitic motion component indicated by an arrow labelled $M_p$, is generated in the same direction as the direct force F generating torque T applied to the pivot 50. During the track following and seek modes the direction of the parasitic motion $M_p$ is opposite the direction of the dominant motion $M_d$. The head movement is composed of the independent movements $M_d$ and $M_p$ superposed on each other. While the parasitic motion $M_p$ is substantially negligible in conventional disk drive units, the parasitic motion component $M_p$ can contribute significantly to track misregistration errors with higher written track densities.

Figure 4:
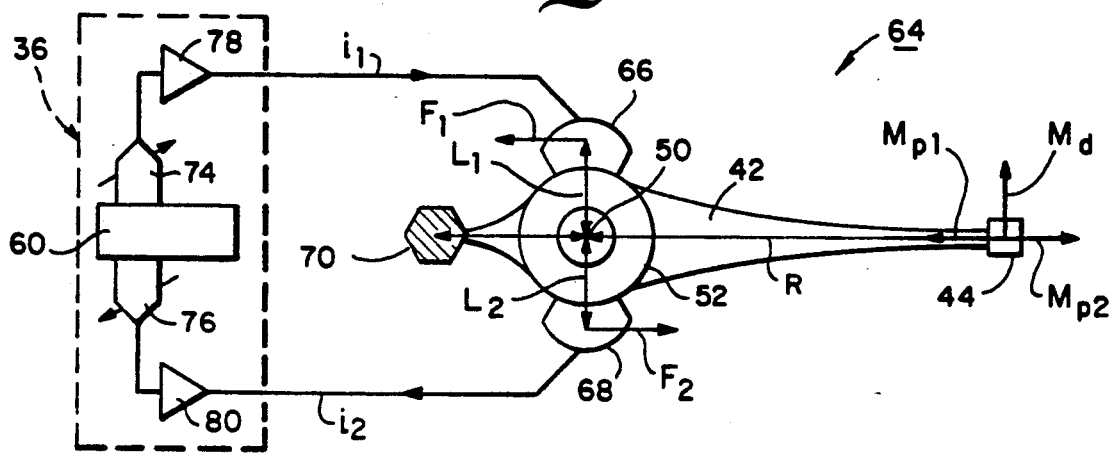
FIG. 4 is a schematic and simplified top view of a rotary actuator including a pair of voice coil motors in accordance with the present invention.

Referring to FIG. 4, a rotary actuator 64 arranged in accordance with the invention is shown. The same reference characters used in FIGS. 1-3 are used for substantially unchanged portions and similar components of the rotary actuator 64. Rotary actuator 64 generates the dominant motion $M_d$ during the seek and track following modes without exciting the parasitic motion $M_p$ in the opposite direction of the desired motion as does the conventional rotary actuator 56 of FIG. 3.

Actuator assembly 64 includes a pair of voice coil motors 66 and 68 as the head driver and a balancing mass 70 aligned with arm 42 for providing mass balancing of arm 42 and head 44 for aligning the center of gravity or mass with the axis of the pivot 50. In optical recording actuators, the laser electronics can be used as the balancing mass 70. The voice coil motors 66 and 68 can include one or more permanent magnets with a movable coil, or a stationary coil with a movable magnet.

In order to move the transducer heads 44, the rotary actuator 64 produces oppositely directed forces $F_1$ and $F_2$ indicated by arrows labelled $F_1$ and $F_2$ to produce a net torque applied about the pivot center 50 without reactive pivot forces. Because the generated direct force $F_1$ counterbalances the generated direct force $F_2$, a zero net force is provided. The effectiveness of the rotary actuator 64 depends upon two parameters. Firstly, the direction of the direct forces $F_1$ and $F_2$ must be parallel and opposite each other, and secondly, the magnitude of the direct forces $F_1$ and $F_2$ must be substantially equal to optimize the force cancellation. Parallel and oppositely directed forces $F_1$ and $F_2$ are obtained by placing the voice coils motors 66 and 68 symmetrically about the pivot 50 with the line of action of each force component equidistant from the pivot. Equal magnitudes of the direct forces $F_1$ and $F_2$ are controlled by adaptively adjusting the magnitude of the applied coil currents.

As shown, controller 36 includes a pair of adaptive gain controller circuits 74 and 76 and a pair of coil drivers 78 and 80 for generating a coil current $i_1$ applied to voice coil motor 66 and a coil current $i_2$ applied to voice coil motor 68, respectively, operatively controlled by the microprocessor 60 to produce direct forces $F_1$ and $F_2$ having equal magnitude. Alternatively, a single coil current driver could apply coil current to both voice coils motors 66 and 68 with an acceptable force constant $K_F$ balance or match for the voice coils motors (VCM's) 66 and 68.

Torques $T_1$ and $T_2$ which can be represented as, $$T_1 = K_F i_1 L_1$$

$$T_2 = K_{F2}i_2L_2,$$

where $L_1$ and $L_2$ represent the distance of the direct forces $F_1$ and $F_2$ from the pivot 50 and are equal and the direct forces $F_1$ and $F_2$ are equal and opposite. The resulting net force is zero and the resulting net torque $T_{NET}$ applied to the pivot 50 equals the sum of torques $T_1$ and $T_2$ and can be represented as $T_{NET} = 2FL$ if $F_1 = F_2 = F$ and $L_1 = L_2 = L$.

The effect of parasitic motion $M_p$ during seek and track following modes is effectively eliminated by the force balancing configuration of VCM's 66 and 68. When the direct forces $F_1$ and $F_2$ are not balanced, dominant motion $M_d$ of the heads 44 can produce unbalanced parasitic motion components $M_{p1}$ and $M_{p2}$, in the same direction as the direct forces $F_1$ and $F_2$, respectively, as indicated by arrows labelled $M_{p1}$ and $M_{p2}$. Parasitic motion components $M_{p1}$ and $M_{p2}$ are orthogonal to the dominant motion $M_d$ aligning with tracks 32, and do not contribute to track misregistration (TMR) errors.

Figure 5:
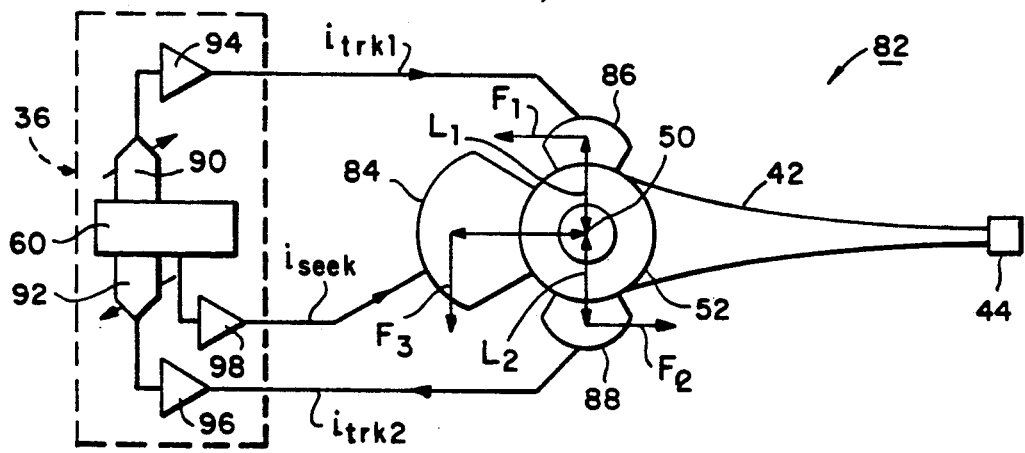
FIG. 5 is a schematic and simplified top view of a rotary actuator including a pair of voice coil motors and a third seek voice coil motor in accordance with another embodiment of the present invention.

Referring to FIG. 5, an alternative rotary actuator 82 includes a seek voice coil motor (VCM) 84 and a pair of track following voice coil motors (VCM's) 86 and 88 arranged similarly to VCM's 66 and 68 of rotary actuator 64 of FIG. 4. Using the additional seek VCM 84 increases the overall speed of the DASD file as compared with the rotary actuator 64 with VCM's 66 and 68 of FIG. 4. In the rotary actuator 82, the track following VCM's 86 and 88 are arranged to produce parallel and oppositely directed forces of equal magnitude to eliminate the effects of parasitic motion $M_p$ from the dominant motion $M_d$, to minimize TMR errors and to facilitate increased written track density.

Actuator assembly 82 can utilize a conventional VCM for the seek VCM 84 and a pair of miniature VCM's for the VCM's 86 and 88. The controller 36 includes a pair of adaptive gains 90 and 92, a pair of coil current drivers 94 and 96 for driving the track following VCM's 86 and 88, and a coil current driver 98 for driving the seek VCM 84. Rotary actuator 82 provides redundancy for coil failure with the controller 36 adaptively reconfiguring applied coil currents to accommodate for coil failures.

During the seek mode, a coil current $i_{seek}$ is applied to the seek VCM 84 generating the dominant motion $M_d$ moving the transducer heads 44 to the target track, and the pair of track following VCM's 86 and 88 are idle. During the track following mode, coil currents $i_{trk1}$ and $i_{trk2}$ are applied to the track following VCM's 86 and 88, respectively, and the seek VCM 84 is idle. The actuator assembly 82 provides velocity measurements using induced analog voltage information available in the idle coils that can be used for controlling the seek and track following modes. As the transducer heads 44 are moved, an induced voltage proportional to head velocity is generated in each idle coil. During the seek mode, idle track following VCM's 86 and 88 provide analog voltage information corresponding to head velocity that can be used for dynamically controlling coil current applied to the seek VCM 84. Likewise, the idle seek VCM 84 provides analog voltage information proportional to head velocity that can be used for dynamically controlling the track following VCM's 86 and 88 during the track following mode. During the basic operational modes, the controller 36 has access to a large number of analog voltage samples corresponding to the actual head velocity for determining an accurate position of the transducer heads 44.

Figure 6:
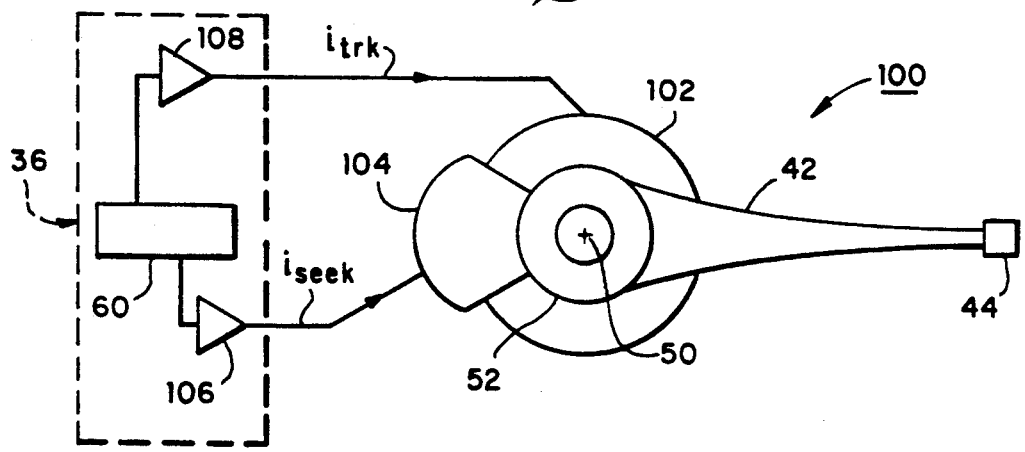
FIG. 6 is a schematic and simplified top view of a rotary actuator including an in-the-hub motor and a seek voice coil motor in accordance with yet another embodiment of the present invention.

Referring now to FIG. 6, an alternative rotary actuator 100 includes an in-the-hub motor 102 and a seek VCM 104. The in-the-hub motor 102 is used instead of the VCM's 66 and 68 of rotary actuator 64 of FIG. 4 or VCM's 86 and 88 of rotary actuator 82 of FIG. 5. The seek VCM 104 provides similar operations as the seek VCM 84 of rotary actuator 82 of FIG. 5. In-the-hub motor 102 can be either a permanent magnet with a movable coil or a stationary coil with a movable magnet. Microprocessor 60 applies a coil current $i_{seek}$ to the seek VCM 104 via a coil current driver 106 during the seek mode and applies a track following current itrk to the in-the-hub motor 102 via a coil current driver 108 during the track following mode. The idle in-the-hub motor 102 can be used as a velocity tachometer during the seek mode and, likewise, the idle seek VCM 104 can be used as a velocity tachometer during the track following mode.

Force components applied by the in-the-hub motor 102 are symmetrically arrayed around the pivot axis, and sum arithmetically to zero in any radial direction. Thus the distributed force components achieve the same result as the counterbalanced forces $F_1$ and $F_2$ of FIGS. 4 and 5. Advantages of the in-the-hub motor 102 are that less physical space is required and an overall reduction of inertia is provided as compared to the rotary actuators 64 and 82 of FIGS. 4 and 5.

In FIGS. 7A, 7B and 7C, alternative methods for controlling the actuator assemblies 82 and 100 of FIGS. 5 and 6 are illustrated with the seek modes starting at time T1 and ending at time T4 followed by the track following modes shown between times T4 and T5. Coil current profiles, $i_{seek}$ applied to the seek VCM 84 or 104 and $i_{trk}$ applied to the VCM 86 and 88 or in-hub motor 102, are shown relative to time.

In FIG. 7A, initially between times T1 to T2 during the seek mode, a large acceleration coil current profile $i_{seek}$ generally designated by 110 is applied to the seek VCM to quickly move the head 44 from one track to another. Between times T2 to T4, a deceleration current profile $i_{seek}$ generally designated by 112 including a dynamic control portion generally designated by 114 starting at time T3 is applied to the seek VCM. During the track following mode, a bias current $i_{seek}$ generally designated by 116 is applied to the seek VCM to cancel bias forces including various sources of constant forces that do not vary with time. During the seek mode between times T1 to T4, the track following current $i_{trk}$ is zero generally designated by 118. During the seek mode, an induced voltage in an idle coil corresponding to head velocity can be measured from the track following VCM's or in-hub-motor. During the track following between times T4 and T5, a track following current profile $i_{trk}$ generally designated by 120 is applied to the track following VCM's or in-hub-motor for generating the net torque by counterbalanced forces for following the track.

Referring to FIG. 7B, in addition to the applied current of FIG. 7A, acceleration and deceleration coil current profiles $i_{trk}$ generally designated by 122 and 124, respectively, are applied to the track following VCM's or the in-hub-motor generating net torque T to increase the speed of the rotary actuators 82 and 100 during the seek mode.

Referring to FIG. 7C, an additional control method for applying current during the seek and track following modes is shown. Starting at time T3, dynamic deceleration control is provided by the adjusting the deceleration current profile applied to the pair of track following VCM's or the in-hub-motor generally designated by 126. An offset or bias current profile $i_{trk}$ generally designated by 128 is applied to the track following VCM's or the in-hub-motor to cancel bias forces in addition to generating the net torque for following the track. Dynamic control portion 114 is eliminated from the deceleration current $i_{seek}$ profile 130 applied to the seek VCM. During track following, the seek current $i_{seek}$ is zero generally designated by 132. The track following VCM's 86 and 88 and in the hub motor 102 have lower coil inductance than the seek VCM so that dynamic deceleration control can be more effectively provided.

Several disadvantages of the known single VCM driven rotary actuator 56 of FIG. 3 are overcome by the rotary actuators 64, 82 and 100 of FIGS. 4, 5 and 6, respectively, including that any resulting parasitic motion component $M_p$ is orthogonal to the dominant motion $M_d$ and does not contribute to TMR errors and that overall resonance frequency characteristics are improved. Further advantages include the redundancy against one coil failure; independent performance optimization for seek and track following modes; and the use of idle coil's as velocity tachometers.

While the invention has been described with reference to details of the illustrated embodiments, these details are not intended to limit the scope of the invention as defined in the appended claims.

What is claimed is:

1. A rotary actuator for a direct access storage device including a disk surface having a plurality of tracks for storing data and transducer means for reading and/or writing data on said tracks, said rotary actuator comprising:
    support means for supporting said transducer means relative to said disk surface;
    pivot means defining an axis of rotation spaced from said transducer means, said support means being connected to said pivot means;
    driver means coupled to said support means; said drive means including a pair of voice coil motors disposed diametrically opposite each other about said pivot means for positioning said transducer means over one track and a third voice coil motor for pivoting said transducer means form one track to another track; and
    said pair of voice coil motors for generating oppositely directed forces having a line of action orthogonal to a dominant motion of said transducer means to produce a net torque applied to said support means about said pivot means.

2. A rotary actuator as recited in claim 1 wherein said generated oppositely directed forces have a line of action equidistant from said axis of rotation.

3. A rotary actuator as recited in claim 1 wherein said driver means includes means for applying a coil current to said third voice coil motor to move said transducer means from one track to another track during a seek operation.

4. A rotary actuator as recited in claim 3 wherein at least one of said pair of voice coil motors provides a signal proportional to velocity of said transducer means when said coil current is applied to said third voice coil motor during said seek operation.

5. A rotary actuator as recited in claim 1 wherein said driver means includes a means for applying a coil current to each of said pair of voice coil motors for positioning said transducer means over one track during a track following operation.

6. A rotary actuator as recited in claim 5 wherein said driver means includes means for applying a bias coil current to said third voice coil motor during said track following operation.

7. A rotary actuator as recited in claim 1 wherein said driver means includes means for applying a respective coil current to each of said pair of voice coil motors and said third voice coil motor for moving said transducer means from one track to another track during a seek operation.

8. A rotary actuator as recited in claim 1 wherein said driver means includes means for applying a coil current to each of said pair of voice coil motors for deceleration control of said transducer means during a settle portion of said seek operation.

9. A rotary actuator as recited in claim 1 wherein said third voice coil motor is larger than said pair of voice coil motors.

10. A rotary actuator as recited in claim 1 further comprising an adaptive gain control for adjusting a coil current applied to said pair of voice coil motors for generating said oppositely directed forces having an equal magnitude.

11. A rotary actuator as recited in claim 5 wherein said third voice coil motor provides a signal proportional to velocity of said transducer means when said coil current is applied to said pair of voice coil motors during said track following operation.

12. A method for controlling operational modes of a rotary actuator for a direct access storage device, the rotary actuator including a support for supporting a transducer head and a head driver coupled to the support and including a pair of voice coil motors and a third voice coil motor for moving a transducer head from one track to another track and for positioning the transducer head over one track, said method comprising the steps of:
    applying current to said third voice coil motor for rotating said rotary actuator from one track to another during a seek function; and
    applying current to said pair of voice coil motors for positioning said rotary actuator over one track during a track following function.

13. A method as recited in claim 12 further comprising the step of measuring an induced voltage across said at least one of said pair of voice coil motors during said seek function, said induced voltage being proportional to velocity of said rotary actuator.

14. A method as recited in claim 12 further comprising the step of applying a bias coil current to said third voice coil motor during said track following function.

15. A method as recited in claim 12 further comprising the step of applying a respective current to each of said pair of voice coil motors during said seek operation.

16. A method as recited in claim 12 further comprising the step of applying a respective current to each of said pair of voice coil motors for deceleration control of said transducer head during a settle portion of said seek operation.

17. A method as recited in claim 12 further comprising the step of measuring an induced voltage across said third voice coil motor during said track following function, said induced voltage being proportional to velocity of said rotary actuator.

18. A direct access storage device comprising:

a housing;

at least one disk mounted in said housing for rotation about an axis;

a plurality of tracks for storing data on at least one disk surface arrayed in a pattern around said axis;

transducer means mounted for movement in at least partly a radial direction across said disk surface for reading and/or writing data on said tracks;

support means for supporting said transducer means relative to said disk surface;

pivot means defining an axis of rotation speed from said transducer means, said support means being connected to said pivot means;

driver means coupled to said support means; said driver means including a pair of voice coil motors disposed diametrically opposite each other about said pivot means for positioning said transducer means over one track and a third voice coil motor for pivoting said transducer means from one track to another track; and said pair of voice coil motors for generating oppositely directed forces to produce a net torque applied to said support means about said pivot means.

* * * * *

UNITED STATES PATENT AND TRADEMARK OFFICE
CERTIFICATE OF CORRECTION

PATENT NO. : 5,267,110

DATED : November 30, 1993

INVENTOR(S) : Ottesen et al.

It is certified that error appears in the above-identified patent and that said Letters Patent is hereby corrected as shown below:

Column 7, claim 1, line 43, "drive" should be replaced with --driver--;

Column 7, claim 5, line 68, the first occurrence of the word "a" should be deleted; and Column 10, claim 18, line 1, "speed" should be replaced with --spaced--.

Signed and Sealed this

Nineteenth Day of April, 1994

*Attest:*

BRUCE LEHMAN

*Attesting Officer*     *Commissioner of Patents and Trademarks*